US009538463B2

(12) United States Patent
Chen et al.

(10) Patent No.: US 9,538,463 B2
(45) Date of Patent: Jan. 3, 2017

(54) APPARATUSES AND METHODS FOR WIRELESS FIDELITY (WIFI) NETWORK SELECTION

(71) Applicant: HTC Corporation, Taoyuan, Taoyuan County (TW)

(72) Inventors: Chia-Wei Chen, Taoyuan (TW); Ming-Han Tsai, Taoyuan (TW); Chen-Huang Fan, Taoyuan (TW); Hsin-Ti Chueh, Taoyuan (TW); Chi-Sheng Kai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 163 days.

(21) Appl. No.: 13/957,988

(22) Filed: Aug. 2, 2013

(65) Prior Publication Data

US 2015/0036662 A1    Feb. 5, 2015

(51) Int. Cl.
| | |
|---|---|
| H04W 4/00 | (2009.01) |
| H04W 48/20 | (2009.01) |
| H04W 36/08 | (2009.01) |
| H04W 36/00 | (2009.01) |
| H04W 84/12 | (2009.01) |
| H04W 48/16 | (2009.01) |

(52) U.S. Cl.
CPC ......... *H04W 48/20* (2013.01); *H04W 36/0083* (2013.01); *H04W 36/08* (2013.01); *H04W 48/16* (2013.01); *H04W 84/12* (2013.01)

(58) Field of Classification Search
USPC .......................... 370/329, 331, 333, 338, 252
See application file for complete search history.

(56) References Cited

U.S. PATENT DOCUMENTS

| | | | | |
|---|---|---|---|---|
| 2007/0232307 | A1* | 10/2007 | Ibrahim | H04W 36/30 455/436 |
| 2008/0293404 | A1* | 11/2008 | Scherzer et al. | 455/426.1 |
| 2012/0038475 | A1* | 2/2012 | Lee et al. | 340/502 |
| 2013/0223340 | A1* | 8/2013 | Jeong | 370/328 |
| 2013/0223423 | A1* | 8/2013 | Lee et al. | 370/338 |
| 2013/0231088 | A1* | 9/2013 | Jabara et al. | 455/411 |
| 2014/0185599 | A1* | 7/2014 | Vatanapanpilas | H04W 48/20 370/338 |

\* cited by examiner

*Primary Examiner* — Zewdu A Beyen
(74) *Attorney, Agent, or Firm* — CKC & Partners Co., Ltd.

(57) ABSTRACT

A wireless communications device is provided with a storage unit and a processor. The storage unit is configured to store signal strengths and throughputs of a plurality of Access Points (APs) which the wireless communications device was previously or is currently connected to. The processor is configured to update the stored signal strength and throughput of the currently connected AP, and scan for available APs nearby in response to detecting a low-throughput condition of the currently connected AP.

10 Claims, 4 Drawing Sheets

APPARATUSES AND METHODS FOR WIRELESS FIDELITY (WIFI) NETWORK SELECTION

BACKGROUND OF THE INVENTION

Field of the Invention

The invention generally relates to network selections in the field of wireless communications, and more particularly, to apparatuses and methods for Wireless-Fidelity (WiFi) network selection.

Description of the Related Art

With growing demand for ubiquitous computing and networking, various wireless technologies have been developed, and among all these wireless technologies, the Wireless Fidelity (WiFi), based on the IEEE 802.11 standards, is a Wireless Local Area Network (WLAN) technology which is widely adopted and very popular for the advantages of low cost/effort and high bandwidth. A WiFi network is typically implemented as an extension to wired Local Area Networks (LANs) and is able to provide the last few meters of connectivity between a wired network and mobile or fixed devices. For example, by establishing a WiFi network in the office environment, network resources, such as printers, file servers, modem banks, e-mail servers, etc., may be shared among the employees, while maintaining the distributed computing power for employees or workstation computers. To an increasing extent, the benefits of establishing a WiFi network are now available for the household environment as well.

More than often, a mobile device may detect several Access Points (APs) in an area. Mobile services may be obtained after connecting to one of the detected APs automatically or by user selection. However, the mobile device generally switches from a currently connected AP to another AP only when the connection to the currently connected AP is lost. Also, the mobile device will stay with the same AP, regardless of whether the throughput of the AP becomes poor and whether there may be other APs available with higher throughputs. As a result, the mobile device may not maintain an acceptable throughput from the currently connected AP, and a user may experience serious delays with the wireless services.

BRIEF SUMMARY OF THE INVENTION

In one aspect of the invention, a wireless communications device is provided. The electronic device comprises a storage unit and a processor. The storage unit is configured to store signal strengths and throughputs of a plurality of APs which the wireless communications device was previously or is currently connected to. The processor is configured to update the stored signal strength and throughput of the currently connected AP, and scan for available APs nearby in response to detecting a low-throughput condition of the currently connected AP.

In another aspect of the invention, a method for WiFi network selection is provided. The method comprises the steps of maintaining a database for storing signal strengths and throughputs of a plurality of APs which a wireless communications device was previously or is currently connected to, and scanning for available APs nearby in response to detecting a low-throughput condition of the currently connected AP.

Other aspects and features of the invention will become apparent to those with ordinary skill in the art upon review of the following descriptions of specific embodiments of the wireless communications devices and methods for WiFi network selection.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is to be understood that, the term "WiFi", as used herein, is meant to encompass any type of 802.11 standards, including 802.11a, 802.11b, 802.11g, 802.11n, 802.11 ac, etc.

Figure 1:
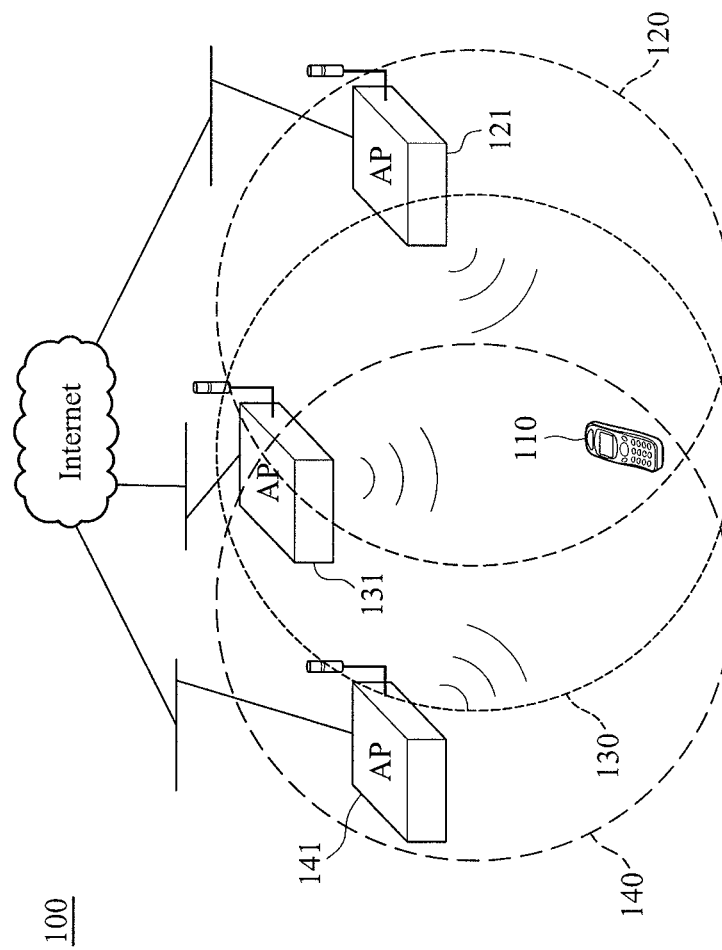
FIG. 1 is a block diagram of a wireless communications environment according to an embodiment of the invention.

FIG. 1 is a block diagram of a wireless communications environment according to an embodiment of the invention. The wireless communications environment 100 comprises a wireless communications device 110 and three WiFi networks 120, 130, and 140. The wireless communications device 110 may selectively connect to one of the WiFi networks 120, 130, and 140 for obtaining wireless services. Each of the WiFi networks 120, 130, and 140 is established by a respective AP (denoted with numbering 121, 131, and 141) which may be connected to a LAN by an Ethernet cable. The APs 121~141 receive, buffer, and transmit data between the WiFi networks 120~140 and the wired network infrastructure, respectively. Each of the APs 121~141 may have, on average, a coverage varying from 20 meters in an area with obstacles (walls, stairways, elevators etc) to 100 meters in an area with clear line of sight. Note that, although the wireless communications device 110 is shown as a mobile phone in FIG. 1, the wireless communications device 110 may be a laptop, a tablet PC, or a portable multimedia player or gaming device, which is capable of wireless communications using the WiFi technology.

Figure 2:
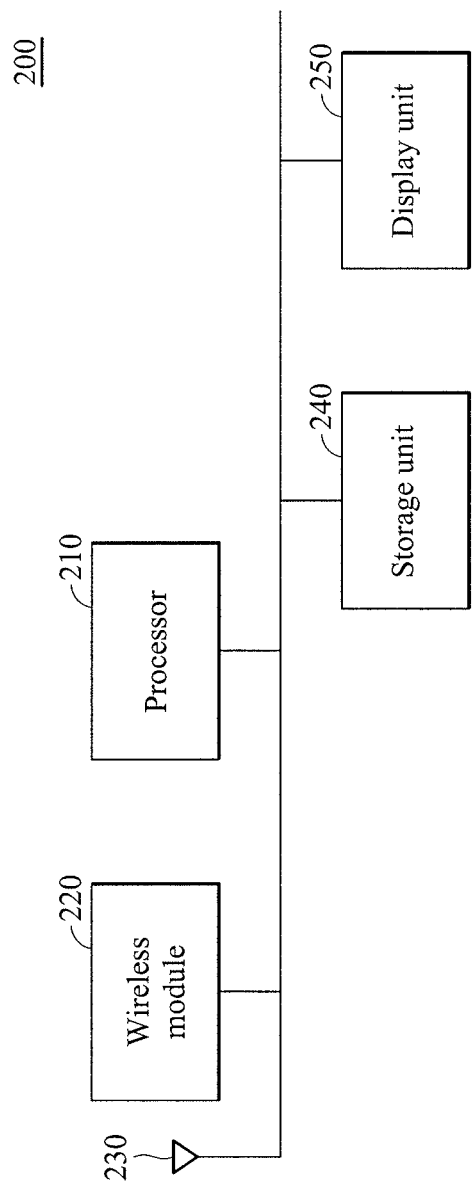
FIG. 2 is a block diagram illustrating the hardware architecture of the wireless communications device 110 according to an embodiment of the invention.

FIG. 2 is a block diagram illustrating the hardware architecture of the wireless communications device 110 according to an embodiment of the invention. The hardware architecture 200 contains a processor 210, a wireless module 220, an antenna 230, a storage unit 240, and a display unit 250. The processor 210 may be a general-purpose processor, an application processor, or a Micro Control Unit (MCU), which is responsible for providing the processing and computational functionality. The wireless module 220 is responsible for providing the functionality of wireless communications using the WiFi technology, and executing the method for WiFi network selection of the invention. Specifically, the wireless module 220 may contain a Baseband unit (not shown) and a Radio Frequency (RF) unit (not shown) for providing the functionality of wireless communications.

further store the Service Set ID (SSID) and Basic Service Set ID (BSSID) of the APs for identification purposes. A schematic diagram of an exemplary database is shown below.

TABLE 1

| SSID | BSSID | Throughput | Transmission (TX) rate | Signal strength (RSSI) |
|---|---|---|---|---|
| HTCOfficeWLAN1 | 001B90573FE0 | 10 Mbps | 54 Mbps | −50 dBm |
| HTCOfficeWLAN2 | 002D24563FF0 | 13 Mbps | 72 Mbps | −55 dBm |
| . | . | . | . | . |
| . | . | . | . | . |
| . | . | . | . | . |

Specifically, the Baseband unit (not shown) may be responsible for baseband signal processing, including analog to digital conversion (ADC)/digital to analog conversion (DAC), gain adjusting, modulation/demodulation, encoding/decoding, and so on. The RF unit (not shown) may be responsible for receiving RF wireless signals via the antenna 230, converting the received RF wireless signals to baseband signals, which are processed by the Baseband unit (not shown), or receiving baseband signals from the Baseband unit (not shown) and converting the received baseband signals to RF wireless signals, which are later transmitted via the antenna 230. The RF unit (not shown) may also contain multiple hardware devices to perform radio frequency conversion. For example, the RF unit (not shown) may comprise a mixer to multiply the baseband signals with a carrier oscillated in the radio frequency of the wireless communications system, wherein the radio frequency may be 2.4, 3.6, or 5 GHz utilized in WiFi systems, depending on the version of 802.11 in use.

The storage unit 240 may be a volatile memory, such as a Random Access Memory (RAM), a Non-Volatile RAM (NVRAM), such as a FLASH memory, a hard disk, an optical disk, or any combination thereof, for storing the signal strengths and throughputs of a plurality of Access Points (APs) which the wireless communications device 110 was previously or is currently connected to, e.g., the APs 121~141, wherein the stored signal strengths and throughputs may be maintained as a database. The display unit 250 may be a Cathode Ray Tube (CRT) screen, a Liquid Crystal Display (LCD), a plasma display panel, a touch panel, or others, for displaying a graphic user interface for a user to interact with. Although not shown, the hardware architecture 200 may comprise other functional units, such as a keyboard/keypad, a mouse, and a touch pad, etc.

Alternatively, in another embodiment, the processor 210 may be incorporated into the wireless module 220, wherein the processor 210 may be an MCU of a WiFi Baseband chip in the wireless module 220.

Figure 3:
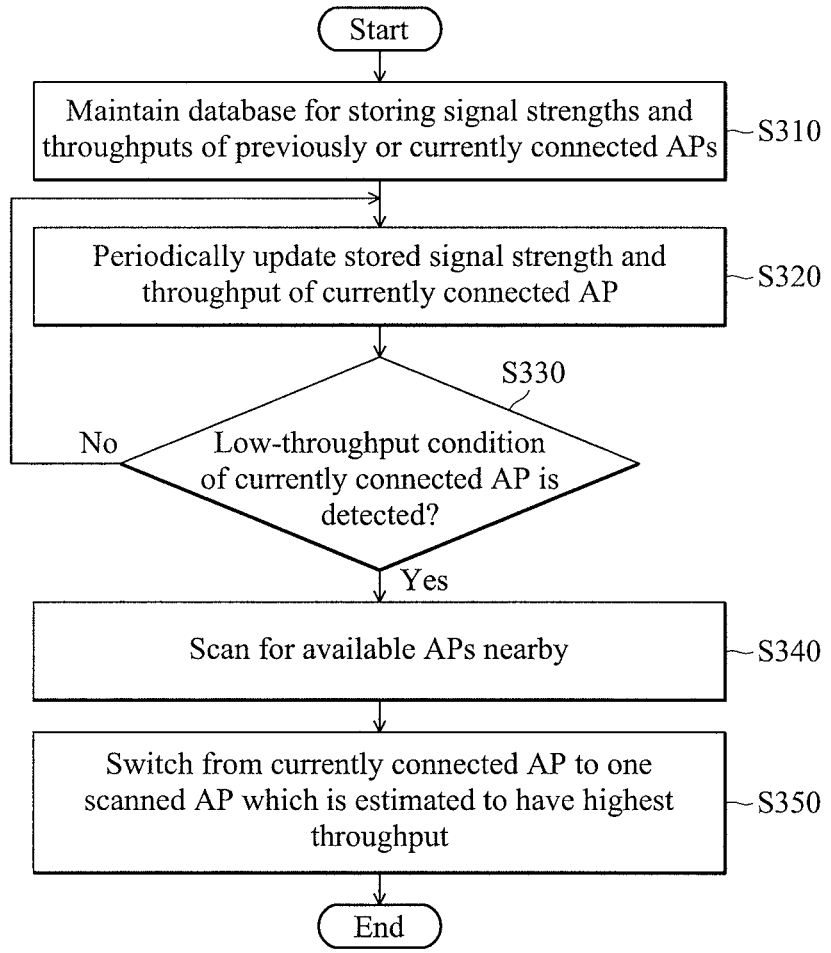
FIG. 3 is a flow chart illustrating the method for WiFi network selection according to an embodiment of the invention.

FIG. 3 is a flow chart illustrating the method for WiFi network selection according to an embodiment of the invention. To begin, the wireless communications device 110 maintains a database for storing signal strengths and throughputs of the APs which the wireless communications device 110 was previously or is currently connected to (step S310). In one embodiment, the database may have a respective entry for storing the signal strength and throughput of each AP. In another embodiment, the database may have multiple entries for storing the signal strengths and throughputs of a respective AP, which were detected at different times. Note that, the throughput referred to herein may be the average throughput or the peak throughput. In addition to the signal strengths and throughputs, the database may Next, the wireless communications device 110 periodically updates the stored signal strength and throughput of the currently connected AP (step S320). The wireless communications device 110 may use a timer to count a predetermined period of time, and each time the timer expires, the wireless communication device 110 may detect the signal strength and throughput of the currently connected AP and update the detected value to the database. Meanwhile, the wireless communications device 110 determines whether a low-throughput condition of the currently connected AP has been detected (step S330). In one embodiment, the wireless communications device 110 may determine whether a number of retried transmission attempts has exceeded a predetermined level, and if so, the low-throughput condition is detected.

If the throughput of the currently connected AP is fair or good (i.e., not determined as low throughput), the method returns back to step S320 to keep updating the stored signal strength and throughput of the currently connected AP. Otherwise, if a low-throughput condition of the currently connected AP has been detected, the wireless communications device 110 scans for available APs nearby (step S340). The scanning result may contain the SSIDs, BSSIDs, and signal strengths of the scanned APs. With the scanning result, the wireless communications device 110 switches from the currently connected AP to one of the scanned APs which is estimated, using the stored signal strengths and throughputs, to have the highest throughput among the scanned APs (step S350), and the method ends.

In another embodiment, before step S350, the wireless communications device 110 may sort the scanned APs in a descending order by the estimated throughputs, and if step S350 is not successful, the wireless communications device 110 may further switch from the currently connected AP to the next scanned AP in the descending order. In other words, step S350 may be repeated for the scanned APs one-by-one in the descending order, until the wireless communications device 110 has successfully switched from the currently connected AP to one of the scanned APs.

Specifically, for each scanned AP, the wireless communications device 110 may query the database to retrieve the corresponding signal strength(s) and throughput(s) for estimation. Take the Received Signal Strength Indicator (RSSI) as an indicator for signal strength and the Transmission (TX) rate as an indicator for throughput, for example. If the stored RSSI and TX rate of a previously connected AP are −50 dBm and 54 Mbps, respectively, and the current RSSI of this AP obtained from the scanning result is −80 dBm, then the current TX rate of this AP is 24 Mbps and the throughput may be estimated by applying a predetermined function, such as a linear function, a quadratic function, or a continuous function, etc., to the stored values. Alternatively, the database may store the signal strengths, TX rates, and throughputs of a previously connected AP at different times, and all or some of the stored values may be used for estimation. For example, if the stored RSSIs, TX rates, and throughputs of a previously connected AP at time t1 and t2 are (−50 dBm, 54 Mbps, 20 Mbps) and (−60 dBm, 48 Mbps, 15 Mbps), respectively, and the current RSSI of this AP obtained from the scanning result is −80 dBm, then the estimated throughput of this AP may be 5 Mbps by linear interpolation of the stored values. Note that, another indicator, such as the Signal to Noise Ratio (SNR), the Signal to Interference Ratio (SIR), or the Signal to Interference plus Noise Ratio (SINR), etc., may be used for signal strength, and another indicator, such as Reception (Rx) rate or others, may be used for throughput estimation.

Figure 4:
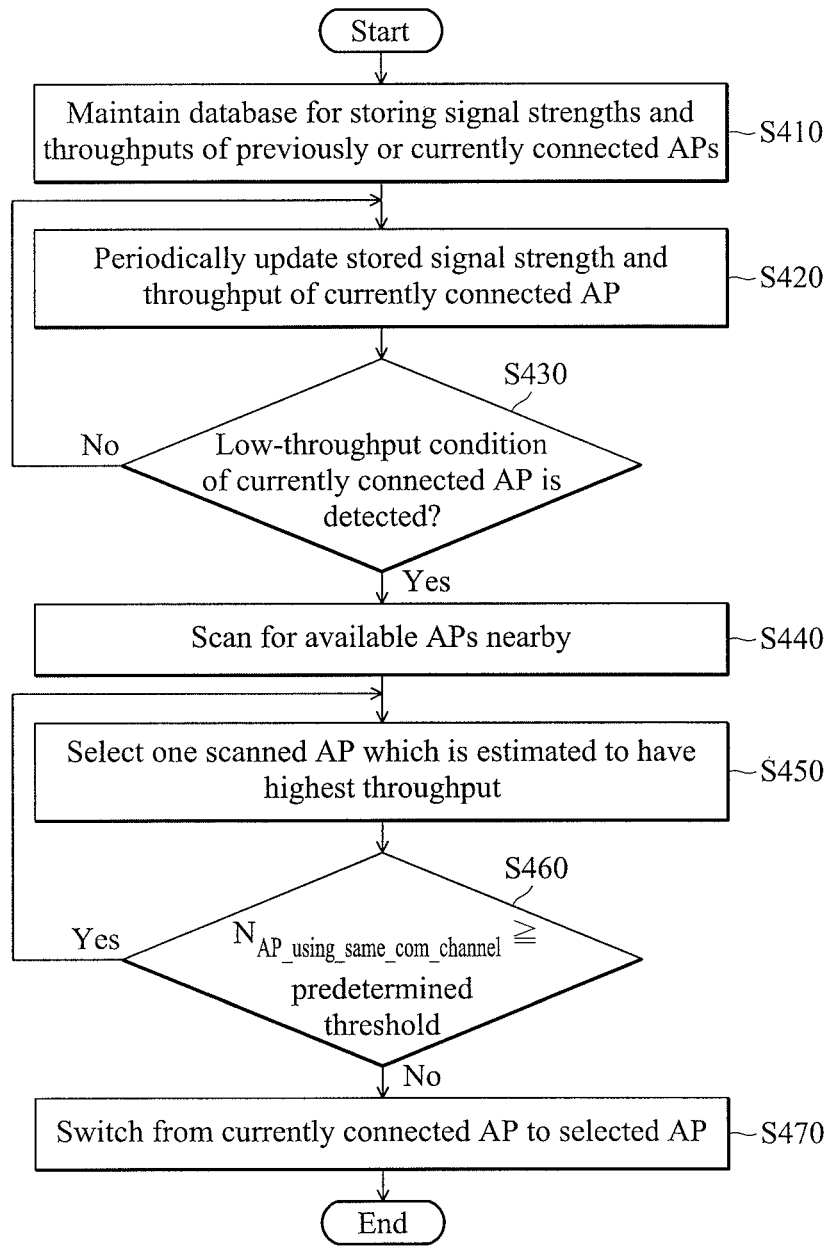
FIG. 4 is a flow chart illustrating the method for WiFi network selection according to another embodiment of the invention.

FIG. 4 is a flow chart illustrating the method for WiFi network selection according to another embodiment of the invention. Similar to FIG. 3, a database is maintained for storing signal strengths, TX rates, and throughputs of previously or currently connected APs, in which the stored signal strength and throughput of the currently connected AP is periodically updated, and it is determined whether a low-throughput condition of the currently connected AP has been detected (steps S410~S430). Subsequently, if a low-throughput condition of the currently connected AP has been detected, the wireless communications device 110 scans for available APs nearby (step S440). The scanning result may contain the SSIDs, BSSIDs, signal strengths, and used communication channels of the scanned APs. With the scanning result, the wireless communications device 110 first selects one of the scanned APs which is estimated, using the stored signal strengths and throughputs, to have the highest throughput among the scanned APs (step S450), and determines whether the number of APs using the same communication channel as the selected AP (denoted as $N_{AP\_using\_same\_com\_channel}$ in FIG. 4) is greater than or equal to a predetermined threshold (step S460).

If the number of APs using the same communication channel as the selected AP is greater than or equal to the predetermined threshold, it is expected that the interference caused between the APs using the same communication channel may be great and the throughput of the selected AP would not be good enough, so the method returns back to step S450 to select another scanned AP which is estimated to have the next highest throughput, until the selected AP qualifies for not having too many other APs which are using the same communication channel.

Subsequent to step S460, if the number of APs using the same communication channel as the selected AP is less than the predetermined threshold, the wireless communications device 110 switches from the currently connected AP to the selected AP (step 470), and the method ends.

It is noted that, the method for WiFi network selection proposed in the invention enables a wireless communications device to detect a low-throughput condition of a currently connected AP, and to initiate switching from the currently connected AP to another AP before losing connection to the currently connected AP. Moreover, by applying the method for WiFi network selection of the invention, an AP with high throughput may be efficiently selected among all available APs for the switching between APs, so that the burden of trying out the available APs one-by-one for finding an AP with a high throughput may be eliminated. Advantageously, power consumption and time may be saved for WiFi network selection of the wireless communications device.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A wireless communications device, comprising:
   a memory, wherein the memory,
   in a state in which the wireless communications device is connected to one of a plurality of Access Points (APs), the plurality of APs comprising said one AP to which the wireless communications device is connected and other APs to which the wireless communications device was previously connected, stores signal strengths and throughputs of the APs which the wireless communications device was previously or is currently connected to; and
   a processor, updating the stored signal strength and throughput of the currently connected AP, and scanning for available APs nearby in response to detecting a low-throughput condition by determining that a number of retried transmission attempts for transmitting data with the currently connected AP has exceeded a predetermined level;
   (a) wherein the processor further switches the wireless communications device from the currently connected AP to one of the scanned APs which is estimated, using the stored signal strengths and throughputs, to have the highest throughput among the scanned APs;
   (b) wherein the processor further determines a respective number of APs using a same communication channel for each of the scanned APs according to the scanning result, and switches the wireless communications device from the currently connected AP to said one of the scanned AP in response to determining that the number of APs using the same communication channel as said one of the scanned AP is less than a predetermined threshold;
   (c) wherein if the number of APs using the same communication channel as said one of the scanned APs is greater than or equal to the predetermined threshold, the processor selects another scanned AP which is estimated to have the next highest throughput, and switches to said another scanned AP in response to determining that the number of APs using the same communication channel as said another scanned AP is less than the predetermined threshold;
   (d) wherein the processor repeats (c) until one of the scanned APs for switching is selected for switching which has a number of APs using the same communication channel therewith that is less than the predetermined threshold.

2. The wireless communications device of claim 1, wherein the processor further sorts the scanned APs in a descending order of the estimated throughputs, and, in response to the switching of the wireless communications device from the currently connected AP to the one of the scanned AP not being successful, switches the wireless communications device from the currently connected AP to a next scanned AP in the descending order.

3. The wireless communications device of claim 1, wherein the updating of the stored signal strength and throughput of the currently connected AP is periodically performed.

4. The wireless communications device of claim 1, wherein the memory further stores the Service Set ID (SSID) and Basic Service Set ID (BSSID) of the APs for identifying the APs.

5. The wireless communications device of claim 1, wherein a Received Signal Strength Indicator (RSSI) and a Transmission (TX) rate are used for determining the signal strength and throughput of each of the APs, respectively.

6. A method for Wireless-Fidelity (WiFi) network selection, comprising:
(a) maintaining a database, in a state in which a wireless communications device is connected to one of a plurality of Access Points (APs), the plurality of APs comprising said one AP to which the wireless communications device is connected and other APs to which the wireless communications device was previously connected, for storing signal strengths and throughputs of the APs which the wireless communications device was previously or is currently connected to;
(b) scanning for available APs nearby in response to detecting a low-throughput condition by determining that a number of retried transmission attempts for transmitting data with the currently connected AP has exceeded a predetermined level;
(c) switching the wireless communications device from the currently connected AP to one of the scanned APs which is estimated, using the stored signal strengths and throughputs, to have the highest throughput among the scanned APs;
(d) determining a respective number of APs using a same communication channel for each of the scanned APs according to the scanning result, and switching the wireless communications device from the currently connected AP to said one of the scanned AP in response to determining that the number of APs using the same communication channel as said one of the scanned AP is less than a predetermined threshold;
(e) if the number of APs using the same communication channel as said one of the scanned APs is greater than or equal to the predetermined threshold, selecting another scanned AP which is estimated to have the next highest throughput, and switching to said another scanned AP in response to determining that the number of APs using the same communication channel as said another scanned AP is less than the predetermined threshold; and
(f) repeating (e) until one of the scanned APs for switching is selected for switching which has a number of APs using the same communication channel therewith that is less than the predetermined threshold.

7. The method of claim 6, further comprising:
sorting the scanned APs in a descending order of the estimated throughputs; and
switching the wireless communications device from the currently connected AP to a next scanned AP in the descending order, in response to the switching of the wireless communications device from the currently connected AP to the one of the scanned AP not being successful.

8. The method of claim 6, further comprising:
periodically updating the stored signal strength and throughput of the currently connected AP.

9. The method of claim 6, wherein the database further stores the Service Set ID (SSID) and Basic Service Set ID (BSSID) of the APs for identifying the APs.

10. The method of claim 6, wherein a Received Signal Strength Indicator (RSSI) and a Transmission (TX) rate are used for determining the signal strength and throughput of each of the APs, respectively.

* * * * *